(12) United States Patent
Lee et al.

(10) Patent No.: US 8,503,394 B2
(45) Date of Patent: Aug. 6, 2013

(54) METHOD OF FAST UPLINK DATA TRANSMISSION FOR HANDOVER

(75) Inventors: Jin Lee, Gyeonggi-do (KR); Yong Ho Kim, Gyeonggi-do (KR); Gi Won Park, Gyeonggi-do (KR); Ae Ran Youn, Gyeonggi-do (KR); Gene Beck Hahn, Gyeonggi-do (KR); Sung Woong Ha, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 494 days.

(21) Appl. No.: 12/678,484

(22) PCT Filed: Sep. 26, 2008

(86) PCT No.: PCT/KR2008/005711
§ 371 (c)(1),
(2), (4) Date: Mar. 16, 2010

(87) PCT Pub. No.: WO2009/045027
PCT Pub. Date: Apr. 9, 2009

(65) Prior Publication Data
US 2010/0208696 A1    Aug. 19, 2010

(30) Foreign Application Priority Data
Oct. 1, 2007  (KR) .................. 10-2007-0098695

(51) Int. Cl.
*H04W 4/00*    (2009.01)
(52) U.S. Cl.
USPC ......................................... 370/331; 455/431

(58) Field of Classification Search
USPC ......................................... 370/331; 455/437
See application file for complete search history.

(56) References Cited

U.S. PATENT DOCUMENTS

| | | | |
|---|---|---|---|
| 7,274,935 B2 | 9/2007 | Balachandran et al. | |
| 2007/0209051 A1* | 9/2007 | Xu et al. | 725/63 |
| 2008/0232326 A1* | 9/2008 | Lindoff et al. | 370/332 |
| 2009/0116434 A1* | 5/2009 | Lohr et al. | 370/329 |
| 2010/0142485 A1* | 6/2010 | Lee et al. | 370/331 |
| 2010/0260140 A1* | 10/2010 | Zhu | 370/331 |

FOREIGN PATENT DOCUMENTS

| | | |
|---|---|---|
| WO | 2007078042 | 7/2007 |
| WO | 2007078051 | 7/2007 |

* cited by examiner

*Primary Examiner* — Sai-Ming Chan
(74) *Attorney, Agent, or Firm* — Lee, Hong, Degerman, Kang & Waimey

(57) ABSTRACT

A fast uplink data transmission method for a handover is disclosed. This method effectively uses a handover signal when there is data to be transmitted to an uplink during an Intra Radio Access Technology (I-RAT) handover, such that it quickly transmits and receives uplink data. The method of transmitting uplink data in a wireless access system includes, transmitting a message including an information bit to a target base station by a mobile station during a handover, wherein the information bit indicates whether the uplink data is present, and receiving a radio resource for transmitting the uplink data from the target base station, if the information bit indicates the uplink data is present, wherein the radio resource is allocated by the target base station. So, uplink user data can be quickly transmitted to a destination while the UE performs the handover.

4 Claims, 5 Drawing Sheets

METHOD OF FAST UPLINK DATA TRANSMISSION FOR HANDOVER

CROSS-REFERENCE TO RELATED APPLICATIONS

This application is the National Stage filing under 35 U.S.C. 371 of International Application No. PCT/KR2008/005711, filed on Sep. 26, 2008, which claims the benefit of earlier filing date and right of priority to Korean Application No. 10-2007-0098695, filed on Oct. 1, 2007.

TECHNICAL FIELD

The present invention relates to a wireless communication system, and more particularly to a method for effectively using a handover signal when there is data to be transmitted to an uplink during an Intra Radio Access Technology (I-RAT) handover, such that it quickly transmits and receives uplink data.

BACKGROUND ART

Generally, a handover function is as follows. According to a handover, although a mobile terminal (also called a user equipment (UE)) making a phone call to another mobile terminal in a communication zone (e.g., a mobile communication cell) moves from an area of one base station (also called an e-nodeB) to an area of another base station (i.e., another eNode-B), a handover from one base station to another base station is carried out, such that the mobile terminal can continuously keep making the phone call to another mobile terminal.

The handover occurs when a radio frequency (RF) channel currently used by a mobile station subscriber (i.e., UE) is in poor condition, or also occurs when the mobile station subscriber UE moves from a current eNode-B area to another eNode-B area.

The handover may be classified into a softer handover, a soft handover, and a hard handover according to channel switching methods.

The softer handover is carried out in one cell, and may indicate that a channel used by the UE is switched to a good channel from among channels of a UE's cell coverage. The soft handover indicates that two neighboring channels are simultaneously operated and finally one of the two neighboring channels is slowly severed. According to Code Division Multiple Access (CDMA) scheme, two or more eNode-Bs use the same frequency band, such that this soft handover can be easily implemented in the CDMA scheme. According to the hard handover, a current call-connected channel is severed, and is immediately connected to another channel.

According to the entity carrying out the above-mentioned handover, the handover may be classified into a Network Controlled Handoff (NCHO), a Mobile Assisted Handoff (MAHO), a Mobile Controlled Handoff (MCHO), etc.

The soft handover and the MAHO from among the above-mentioned schemes will hereinafter be described in detail. Needless to say, another handover method may also be used.

An Intra Radio Access Technology (I-RAT) handover supports a handover between homogeneous networks. If a UE moves from one eNode-B (i.e., a serving eNode-B) to another eNode-B (i.e., a target eNode-B) within the range of a homogeneous network, the I-RAT handover provides this UE with a seamless handover and service continuity, resulting in greater convenience of a user of the UE.

FIG. 1 is a flow chart illustrating a handover and initial network entry process.

Referring to FIG. 1, a UE enters a handover and initial network entry process, and selects a cell at steps S101 and S102. During this cell selection, the UE performs a scanning or ranging process together with one or more eNode-Bs in order to search for a desired eNode-B appropriate for either a network connection or a handover. The UE must perform scheduling either the scanning or sleep period such that it can determine whether or not the UE enters an initial network of the eNode-B or is handed over to a target eNode-B (T-eNB).

When the UE enters the initial network, it establishes synchronization with a serving station (also called a serving eNode-B) and a downlink parameter at step S103. The serving eNode-B (S-eNB) provides services over a network to which the UE will belong. The UE synchronized with the serving eNode-B (S-eNB) acquires an uplink parameter for the serving eNode-B (S-eNB) at step S104. Then, the UE performs the ranging process along with the serving eNode-B (S-eNB) and adjusts uplink parameters for the serving eNode-B (S-eNB) at step S105. By the above-mentioned steps, the UE and the serving eNode-B (S-eNB) form a basic function for communication at step S106. The serving eNode-B (S-eNB) provides the UE and exchanges keys with the UE at step S107. Thus, the UE is registered in the serving eNode-B (S-eNB) at step S108, and establishes an IP connection at step S109.

The serving eNode-B (S-eNB) transmits operation parameters to the UE such that the UE performs a communication process at step S110. If a connection between the UE and the serving eNode-B (S-eNB) is established at step S111, the UE and the serving eNode-B can be normally operated at step S112. While the serving eNode-B (S-eNB) is normally operated, the UE continuously searches for a neighboring eNode-B at step S113, because a quality of service (QoS) is lowered in proportion to the distance from the UE to the serving eNode-B (S-eNB). Therefore, the neighboring eNode-B providing services better than those of the serving eNode-B (S-eNB) is called a target station (i.e., a target eNode-B), such that it can perform the handover to the target eNode-B.

Generally, the handover is carried out when the UE moves from the serving eNode-B (S-eNB) to the target eNode-B (T-eNB). The handover indicates that a wireless interface, service flow, and network access point of the UE are handed over to the target eNode-B (T-eNB). When the UE, the serving eNode-B (S-eNB), or the network administrator determines the handover at step S114, this handover begins.

The UE selects the target eNode-B (T-eNB) at step S115, establishes synchronization with the target eNode-B (T-eNB) and acquires downlink parameters at step S116. The UE acquires uplink parameters of the target eNode-B (T-eNB) at step S117, performs the ranging process together with the target eNode-B (S-eNB) and adjusts uplink parameters at step S118. In this case, if the UE pre-receives an identifier, frequency, and uplink/downlink channel descriptors (UCD/DCD) of the target eNode-B (T-eNB), the scanning process and the synchronization process can be simplified. If the target eNode-B (T-eNB) receives a handover notification message from the serving eNode-B (S-eNB) over a backbone network, a non-competitive initial ranging opportunity can be provided to an UL-MAP.

By the above-mentioned steps, the target eNode-B (T-eNB) forms the basic function at step S119, and the UE and the target eNode-B (T-eNB) perform the ranging and begins to perform the network re-entry process. The UE is re-registered in the target eNode-B (T-eNB), and is re-connected to the target eNode-B (T-eNB) at step S120. Thus, the terminal is registered in the target eNode-B (T-eNB) at step S121. The IP connection of the target eNode-B (T-eNB) is re-established in the UE at step S122. By the above-mentioned steps, the target eNode-B (T-eNB) serves as the serving eNode-B (S-eNB), and can provide the UE with necessary services.

DISCLOSURE

Technical Problem

Accordingly, the present invention is directed to a fast uplink data transmission method for a handover that substantially obviates one or more problems due to limitations and disadvantages of the related art.

If there is a need to transmit uplink data during a generally handover, various complicated processes for transmitting this uplink data are needed. For example, the UE can request radio resources for transmitting uplink data from a target eNode-B (T-eNB), and can transmit the uplink data via the radio resources allocated from the target eNode-B (T-eNB).

An object of the present invention is to provide a method for allowing a user equipment (UE) to transmit uplink data when uplink data exists during the handover.

Another object of the present invention is to provide a method for effectively using a handover signal when data to be transmitted to an uplink exists during the handover, such that the UE can quickly transmit uplink data.

Yet another object of the present invention is to provide a method for quickly transmitting uplink data when the UE performs the handover.

Technical Solution

To achieve these objects and other advantages and in accordance with the purpose of the invention, as embodied and broadly described herein, a method of transmitting uplink data in a wireless access system, the method including: transmitting a message including an information bit to a target base station by a mobile station during handover, wherein the information bit indicates whether the uplink data is present; and receiving a radio resource for transmitting the uplink data from the target base station, if the information bit indicates the uplink data is present, wherein the radio resource is allocated by the target base station.

The message including the information bit may be a handover confirm (HO Confirm) message.

The method may further comprise, transmitting the uplink data via the radio resource to the target base station.

In the receiving of the radio resource, the radio resource may be transmitted using a response message according to the message from the target base station.

The method may further include, providing quality of signal information to a serving base station periodically by the mobile station; receiving a message including a dedicated preamble and an identifier of the mobile station from the serving base station, wherein the identifier is used at the target base station; and synchronizing with the target base station using at least one of the identifier and the dedicated preamble.

In another aspect of the present invention, there is provided a method of receiving an uplink data in a wireless access system, the method including: receiving a message including a information bit from a mobile station, wherein the information bit indicates whether the uplink data is present, and the mobile station is performing a handover; and allocating a radio resource for receiving the uplink data to the mobile station, if the information bit indicates the uplink data is present.

The message including the information bit may be a handover confirm (HO Confirm) message.

The method may further include, synchronizing with the mobile station before receiving the message.

The method may further include, receiving a message requiring handover of the mobile station from the serving base station; and transmitting a message including an identifier of the mobile station and a dedicated preamble to the mobile station, wherein the identifier is used at the target base station.

If the uplink data is present, the information bit may be set to '1', and if the uplink data is not present, the information bit may be set to '0'.

It is to be understood that both the foregoing general description and the following detailed description of the present invention are exemplary and explanatory and are intended to provide further explanation of the invention as claimed.

Advantageous Effects

The present invention has the following effects.

First, according to embodiments of the present invention, uplink user data can be quickly transmitted to a desired destination while the UE performs the handover.

Second, according to the embodiments of the present invention, the UE can quickly transmit uplink user data to a destination, such that it can reduce a delay time caused by the handover.

Third, according to the embodiments of the present invention, the UE can quickly transmit uplink data after performing the handover.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
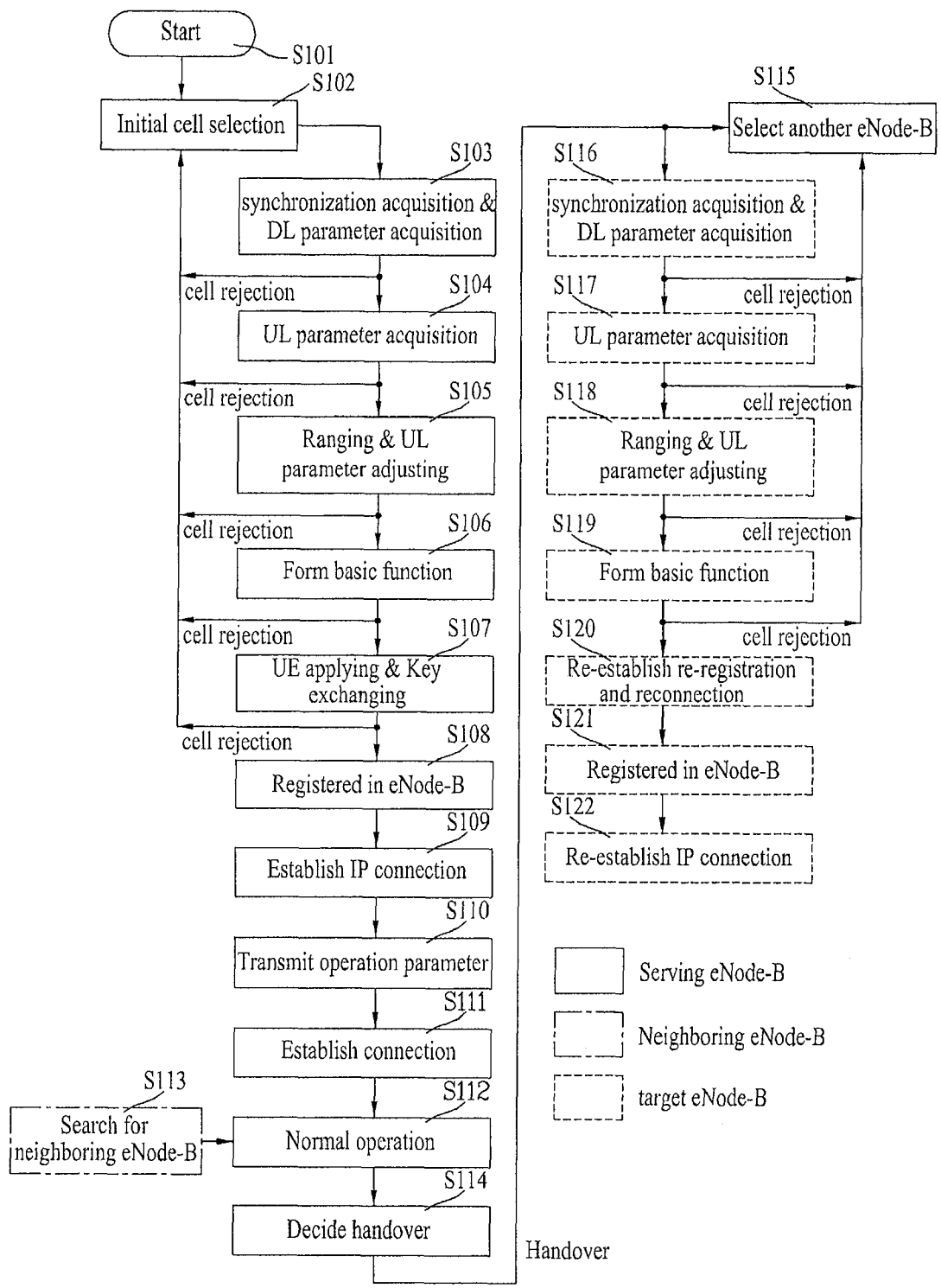
FIG. 1 is a flow chart illustrating a handover and initial network entry process.

Reference will now be made in detail to the preferred embodiments of the present invention, examples of which are illustrated in the accompanying drawings. Wherever possible, the same reference numbers will be used throughout the drawings to refer to the same or like parts.

The following embodiments of the present invention relate to a wireless communication system, and more particularly to a method for effectively using a handover signal when there is data to be transmitted to an uplink during an Intra Radio Access Technology (I-RAT) handover, such that it quickly transmits and receives uplink data.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The above-mentioned embodiments of the present invention are disclosed on the basis of a data communication relationship between a base station (or Node-B or eNode-B) and a user equipment (UE). In this case, the base station is used as a terminal node of a network via which the base station can directly communicate with the user equipment (UE). Specific operations to be conducted by the base station in the present invention may also be conducted by an upper node of the base station as necessary.

In other words, it will be obvious to those skilled in the art that various operations for enabling the base station to communicate with the user equipment (UE) in a network composed of several network nodes including the base station will be conducted by the base station or other network nodes other than the base station. The term "Base Station" may be replaced with a fixed station, Node-B, eNode-B (eNB), or an access point as necessary. The term "mobile station (MS)" may also be replaced with a user terminal, a mobile terminal, user equipment (UE) or a mobile subscriber station (MSS) as necessary.

Also, a transmission end may be indicative of a node for transmitting data or voice services, and a reception end may be indicative of another node for receiving the data or voice services. Thus, in the case of an uplink, the UE is used as the transmission end, and the eNode-B may be used as the reception end. In the case of a downlink, the UE is used as the reception end, and the eNode-B is used as the transmission end.

The following embodiments of the present invention may be supported by standard documents disclosed in at least one of various wireless access systems, for example, the IEEE 802 system, the 3GPP system, the 3GPP LTE system, and the 3GPP2 system. In other words, unexplained steps or parts for definitely disclosing the technical idea of the present invention may be supported by the above-mentioned documents. Also, all the terms or terminologies disclosed in the present invention may be explained by the above-mentioned standard documents.

Prior to describing the present invention, it should be noted that specific terms disclosed in the present invention are proposed for the convenience of description and better understanding of the present invention, and the use of these specific terms may be changed to another format within the technical scope or spirit of the present invention.

For example, a gateway for use in the following embodiments of the present invention is used as an upper entity capable of allowing a protocol to access different communication networks. Specifically, the gateway is indicative of one of protocol converters. In a broad sense, the gateway may be indicative of a functional unit which can control two or more different- or same-communication networks to be interconnected, such that information can be communicated between the different or same communication networks. In a narrow sense, the gateway may be indicative of a functional unit for allowing several communication networks having no compatibility due to different protocols of individual layers of the OSI basic reference model to be interconnected, such that it performs protocol conversion.

The gateway performs protocol conversion among several communication networks having different protocols, such that it can allow necessary information to be communicated among the communication networks. That is, the gateway can designate an IP address of a specific point which is used as a passage connected to the Internet on the condition that a TCP/IP network is connected to the external network. The gateway may reconstruct or change data during the transmission/reception of the data under communication environments. A gateway or serving gateway according to the present invention may be indicative of an upper entity which can control at least one base station and transmit data.

Figure 2:
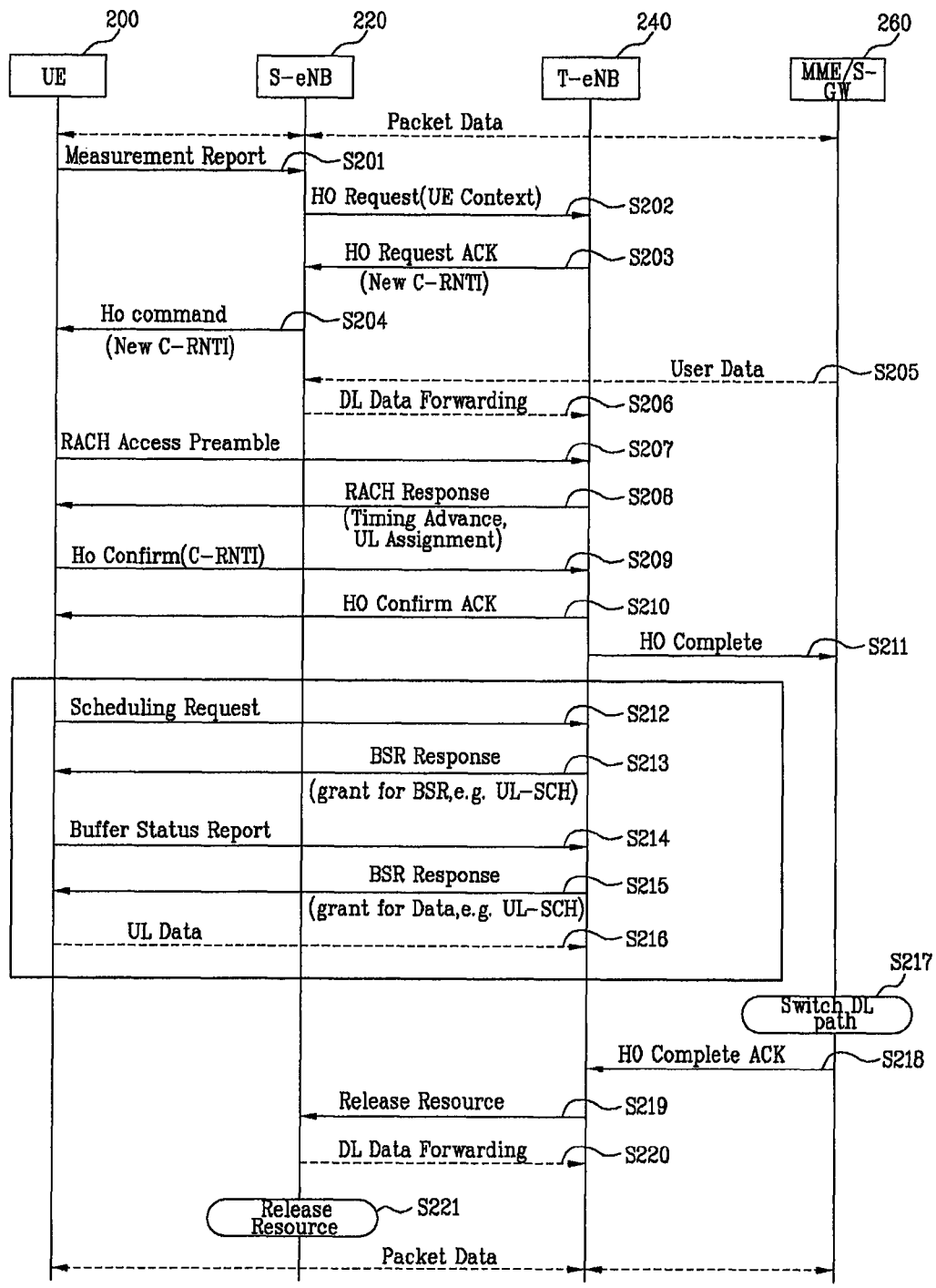
FIG. 2 is a flow chart illustrating an I-RAT handover process of the UE according to the present invention.

FIG. 2 is a flow chart illustrating an I-RAT handover process of the UE according to the present invention.

Referring to FIG. 2, a single communication system may include a user equipment (UE) 200, a serving eNode-B (S-eNB) 220, a target eNode-B (T-eNB) 240, a mobility management entity and a serving gateway (MME/S-GW) 260.

Referring to FIG. 2, the user equipment (UE) 200 transmits and receives packet data to/from the serving eNode-B (S-eNB) 220. The serving eNode-B (S-eNB) 220 transmits and receives user data to/from the serving gateway (S-GW) 260.

The UE 200 periodically transmits a measurement report to the serving eNode-B (S-eNB) 220 which manages a cell to which the UE 200 belongs at step S201. This measurement report may include signal intensity information or signal quality information.

If the serving eNode-B (S-eNB) 220 receives the measurement report from the UE 200, it checks the measurement result collected by the UE 200, and determines if it is preferable for the UE 200 to communicate with another eNode-B rather than the serving eNode-B (S-eNB) 220. If the serving eNode-B (S-eNB) 220 determines that it is preferable for the UE 200 to communicate with another eNode-B rather than the serving eNode-B (S-eNB) 220, it transmits a handover (HO) request message including a UE context to the another eNode-B (i.e., a target eNode-B (T-eNB)) at step S202.

If the target eNode-B (T-eNB) 240 receives the HO request message from the serving eNode-B (S-eNB) 220, it transmits an HO request acknowledgment (ACK) message to the serving eNode-B (S-eNB) 220 in order to answer the HO request message at step S203.

At step S203, the target eNode-B (T-eNB) includes a cell radio network temporary identifier (C-RNTI) in the HO Request ACK message. This C-RNTI is a temporary identifier assigned for allowing the target eNode-B (T-eNB) 240 to identify the UE 200.

The serving eNode-B (S-eNB) 220 loads the C-RNTI, which is contained in the HO request ACK message received from the target eNode-B (T-eNB) 240, on an HO command message, such that the resultant HO command message is transmitted to the UE 200 at step S204.

Although the serving eNode-B (S-eNB) 220 has approved its handover to the target eNode-B (T-eNB) 240, it is determined that the handover from the serving eNode-B (S-eNB) 220 to the target eNode-B (T-eNB) 240 is not yet completed, such that the UE 200 is under the control of the serving eNode-B (S-eNB) 220. Therefore, the serving gateway (S-GW) 260 transmits user data to the serving eNode-B (S-eNB) 220 at step S205.

The serving eNode-B (S-eNB) 220 transmits user data (i.e., downlink (DL) data) to the target eNode-B (T-eNB) 240 acting as a handover-objective eNode-B at step S206. That is, the serving eNode-B (S-eNB) 220 performs DL data forwarding to the target eNode-B (T-eNB) 240 at step S206.

If the UE 200 receives the HO command message from the serving eNode-B (S-eNB) 220, it loads the dedicated preamble received from the target eNode-B (T-eNB) 240 on an RACH access preamble, and transmits the resultant RACH access preamble to the target eNode-B (T-eNB) 240, such that it can be synchronized with a cell of the target eNode-B (T-eNB) 240 at step S207.

At step S207, the random access channel (RACH) is used as a shared channel used by the UE 200 accessing a communication network. Specifically, the RACH may be used for initial access or burst data transmission.

In order to answer the RACH access preamble, the target eNode-B (T-eNB) 240 transmits an RACH response message including both a timing advance value and UL allocation information to the UE 200 at step S208. The UL allocation information may be assigned to the UE 200 by the target eNode-B (T-eNB) 240, such that the UE 200 can transmit a handover (HO) Confirm message to the target eNode-B (T-eNB) 240 using the UL allocation information.

The UE 200 transmits the HO Confirm message to the target eNode-B (T-eNB) 240 using uplink resources contained in the RACH access preamble at step S209.

Upon receiving the HO Confirm message from the UE 200, the target eNode-B (T-eNB) 240 transmits a handover (HO) Confirm ACK message to the UE 200 in order to answer the HO Confirm message at step S210. The target eNode-B (T-eNB) 240 transmits a handover (HO) Complete message to the MME 260 at step S211. It should be noted that the above steps S210 and S211 are almost simultaneously carried out.

If the UE 200 has user data to be transmitted to the uplink, it transmits a scheduling request message to the target eNode-B (T-eNB) 240, such that it requests resource allocation for transmitting uplink data at step S212.

Upon receiving the scheduling request message from the UE 200, the target eNode-B (T-eNB) 240 transmits a response message (e.g., a BRS response message) having resource allocation information transmitting uplink data to the UE 200 at step S213.

At step S213, the target eNode-B (T-eNB) may include uplink resources allocated for transmitting a buffer status report (BSR) message in the response message. For example, the target eNode-B (T-eNB) may assign an uplink sharing channel (UL-SCH) to the UE.

The UE 200 having received the response message from the target eNode-B (T-eNB) 240 transmits a message, which includes the BSR having information of the amount of uplink data to be transmitted, to the target eNode-B (T-eNB) 240 at step S214.

Upon receiving the message having the BSR from the target eNode-B (T-eNB) 240, the UE 200 can check the size of uplink data. Thus, the target eNode-B (T-eNB) 240 transmits the response message (e.g., the BSR response message) for allocating radio resources transmitting uplink data to the UE 200 to the UE 200 at step S215.

At step S216, the UE 200 transmits user data to the target eNode-B (T-eNB) 240 using the allocated uplink resources of the above step S215.

Referring to FIG. 2, the serving gateway (S-GW) 260 having received the HO Confirm message from the target eNode-B (T-eNB) 240 may change a transmission path of user data from the serving eNode-B (S-eNB) 220 to the target eNode-B (T-eNB) 240 at step S217.

If the serving gateway (S-GW) 260 changes the transmission path of user data to another path, the MME 260 transmits an HO Complete ACK message to the target eNode-B (T-eNB) 240, such that it informs the target eNode-B (T-eNB) 240 of the changing of the user data transmission path at step S218.

If the target eNode-B (T-eNB) 240 receives the HO Complete ACK message from the MME 260 to recognize the changed transmission path of the user data, it transmits a Release Resource Message, which requests the serving eNode-B (S-eNB) 220 to delete all information for establishing data communication with the UE 200, to the serving eNode-B (S-eNB) 220 at step S219.

Upon receiving the above-mentioned message for requesting the deletion of UE information from the target eNode-B (T-eNB) 240, it forwards downlink data packets to be transmitted to the UE 200 to the target eNode-B (T-eNB) 240 at step S220.

The serving eNode-B (S-eNB) 220 releases and deletes all information associated with the UE 200 at step S221.

By the above-mentioned steps of FIG. 2, the UE 200 can transmit uplink data during the handover. However, in the case of using the above-mentioned steps of FIG. 2, the UE 200 must perform a variety of processes together with the target eNode-B (T-eNB) 240 without quickly transmitting uplink data.

Figure 3:
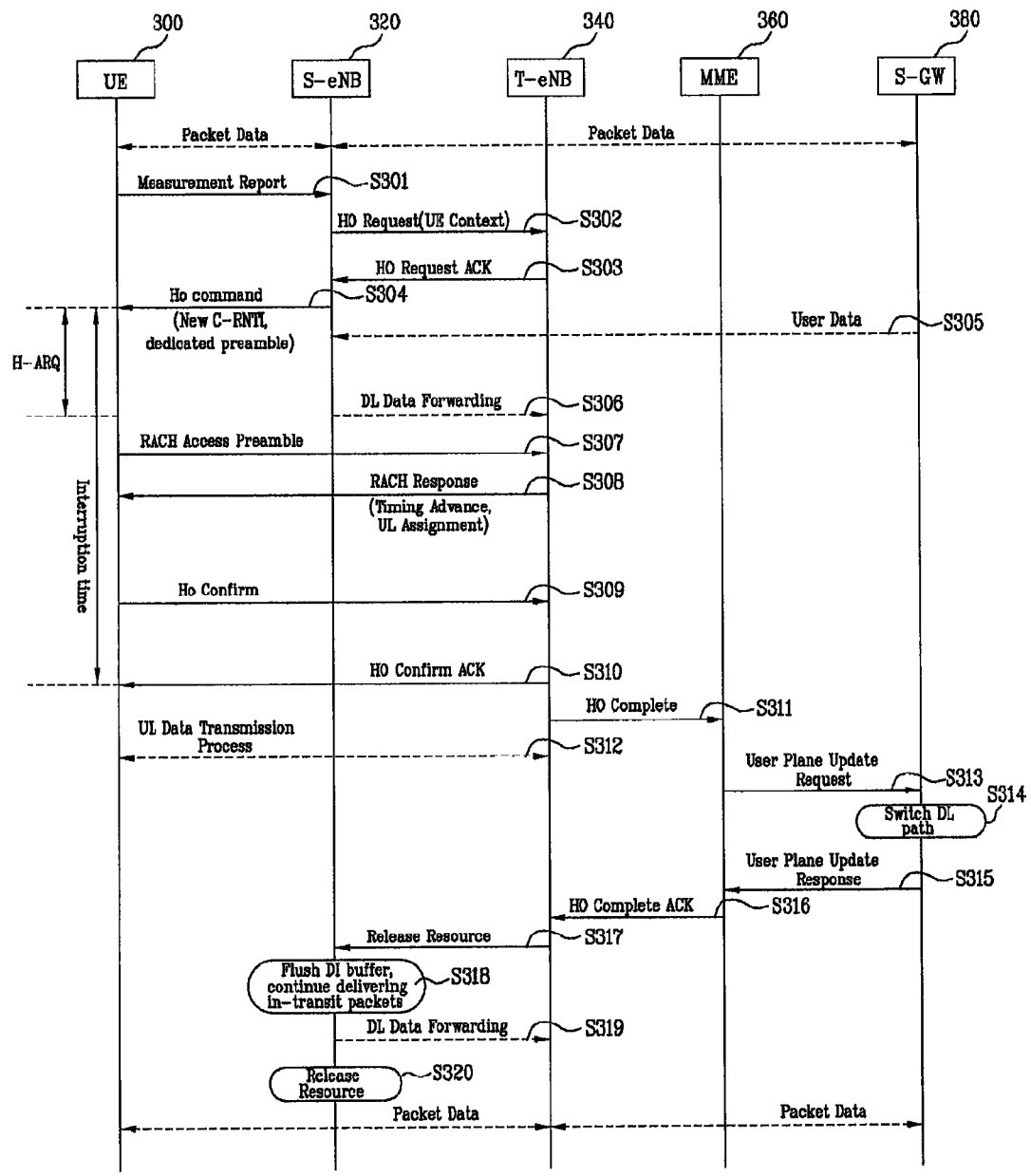
FIG. 3 is a flow chart illustrating a signal processing step performed when there is uplink data during the UE's handover according to one embodiment of the present invention.

FIG. 3 is a flow chart illustrating a signal processing step performed when there is uplink data during the UE's handover according to one embodiment of the present invention.

Referring to FIG. 3, a single communication system may include a user equipment (UE) 300, a serving eNode-B (S-eNB) 320, a target eNode-B (T-eNB) 340, a mobility management entity (MME) 360 and a serving gateway (S-GW) 380.

Referring to FIG. 3, the user equipment (UE) 300 transmits and receives packet data to/from the serving eNode-B (S-eNB) 320. The serving eNode-B (S-eNB) 320 transmits and receives user data to/from the serving gateway (S-GW) 380.

The UE 300 periodically transmits a measurement report to the serving eNode-B (S-eNB) 320 which manages a cell to which the UE 300 belongs at step S301. This measurement report may include signal intensity information or signal quality information.

If the serving eNode-B (S-eNB) 320 receives the measurement report from the UE 300, it checks the measurement result collected by the UE 300, and determines if it is preferable for the UE 300 to communicate with another eNode-B rather than the serving eNode-B (S-eNB) 320. If the serving eNode-B (S-eNB) 320 determines that it is preferable for the UE 300 to communicate with another eNode-B rather than the serving eNode-B (S-eNB) 320, it transmits a handover (HO) request message including a UE context to the another eNode-B (i.e., a target eNode-B (T-eNB)) at step S302.

If the target eNode-B (T-eNB) 340 receives the HO request message from the serving eNode-B (S-eNB) 320, it transmits an HO request acknowledgment (ACK) message to the serving eNode-B (S-eNB) 320 in order to answer the HO request message at step S303.

At step S303, the HO request ACK message may include a cell radio network temporary identifier (C-RNTI) and a dedicated preamble. This C-RNTI is a temporary identifier assigned for allowing the target eNode-B (T-eNB) 340 to identify the UE 300. This dedicated preamble is a unique code allocated to the UE 300 by the target eNode-B (T-eNB) 340, such that it can prevent the UE 300 from colliding with other UEs during a random access process capable of establishing synchronization between the UE 300 and the target eNode-B (T-eNB) 340.

The serving eNode-B (S-eNB) 320 loads the C-RNTI and the dedicated preamble, which are contained in the HO request ACK message received from the target eNode-B (T-eNB) 340, on an HO command message, such that the resultant HO command message is transmitted to the UE 300 at step S304.

Although the serving eNode-B (S-eNB) 320 has approved its handover to the target eNode-B (T-eNB) 340, it is determined that the handover from the serving eNode-B (S-eNB) 320 to the target eNode-B (T-eNB) 340 is not yet completed, such that the UE 100 is under the control of the serving eNode-B (S-eNB) 320. Therefore, the serving gateway (S-GW) 380 transmits user data to the serving eNode-B (S-eNB) 320 at step S305.

The serving eNode-B (S-eNB) 320 forwards user data (i.e., downlink (DL) data) to the target eNode-B (T-eNB) 340 acting as a handover-objective eNode-B at step S306. That is, the serving eNode-B (S-eNB) 320 performs DL data forwarding to the target eNode-B (T-eNB) 340 at step S306.

If the UE 300 receives the HO command message from the serving eNode-B (S-eNB) 320, it loads the dedicated preamble received from the target eNode-B (T-eNB) 340 on an RACH access preamble, and transmits the resultant RACH access preamble to the target eNode-B (T-eNB) 340, such that it can be synchronized with a cell of the target eNode-B (T-eNB) 340 at step S307.

At step S307, the random access channel (RACH) is used as a shared channel used by the UE 300 accessing a communication network. Specifically, the RACH may be used for initial access or burst data transmission.

In order to answer the RACH access preamble, the target eNode-B (T-eNB) 340 transmits an RACH response message including both a timing advance value and UL allocation information to the UE 300 at step S308. The UL allocation information may be assigned to the UE 300 by the target eNode-B (T-eNB) 340, such that the UE 300 can transmit a handover (HO) Confirm message to the target eNode-B (T-eNB) 340 using the UL allocation information.

After establishing synchronization with the target eNode-B (T-eNB) 340 by the above-mentioned steps, if there is uplink data to be transmitted to the target eNode-B (T-eNB) 340, the UE transmits a handover (HO) Confirm message to the target eNode-B (T-eNB) 340 using uplink resources contained in the RACH message at step S309.

At step S309, the UE may include an information field indicating the presence of data to be transmitted to the uplink in the HO Confirm message. The information field may be represented by a variety of formats. For example, the information field may be represented by a flag of one bit.

Figure 4:
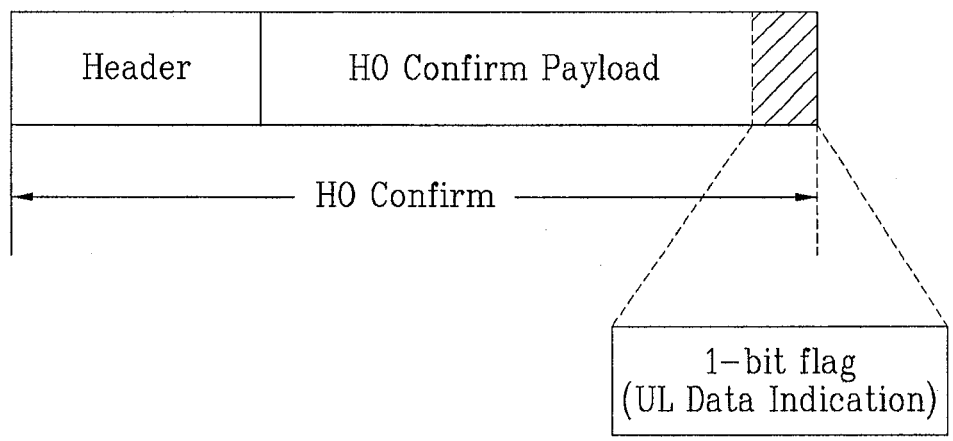
FIG. 4 is a structural diagram illustrating an HO Confirm message according to another embodiment of the present invention.

FIG. 4 is a structural diagram illustrating an HO Confirm message according to another embodiment of the present invention.

Referring to FIG. 4, the HO confirm message may include a header, a HO confirm message, and an information field. This information field may indicate whether or not the UE has uplink data. For example, the information field may indicate the presence or absence of uplink (UL) data indication by the flag of one bit (i.e., 1-bit flag).

In this case, if the 1-bit flag is represented by '1', this means that there is uplink data. If the 1-bit flag is represented by '0', this means that there is no uplink data. Needless to say, the 1-bit flag of '0' may indicate the presence of uplink data, and the other 1-bit flag of '1' may indicate the absence of uplink data.

Referring back to FIG. 3, upon receiving the HO Confirm message from the UE 300, the target eNode-B (T-eNB) 340 transmits a handover (HO) Confirm ACK message to the UE 300 in order to answer the HO Confirm message at step S310. The target eNode-B (T-eNB) 340 transmits a handover (HO) Complete message to the MME 360 at step S311. It should be noted that the above steps S310 and S311 are almost simultaneously carried out.

In this case, since the UE 300 establishes synchronization with the target eNode-B (T-eNB) 340, it can communicate with the target eNode-B (T-eNB) 340. Therefore, if the UE 300 has data to be transmitted to the uplink (i.e., the UE 300 has uplink data), it may transmit the uplink data transmission process together with the target eNode-B (T-eNB) 340 at step S312.

The MME 360 allows a specific request to be contained in a User Plane Update Request message, and transmits the resultant user plane update request message to the serving gateway (S-GW) 380 at step S313. In this case, this specific request may shift a DL-data transmission path formed by both the serving gateway (S-GW) 380 and the serving eNode-B (S-eNB) 320 to the target eNode-B (T-eNB) 340.

If the serving gateway (S-GW) 380 receives the user plane update request message from the MME 360 at step S314, it switches a DL transmission path of the user data to another path at step S314, and transmits a User Plane Update Response message answering the User Plane Update request message to the MME 360 at step S315.

If the MME 360 receives the User Plane Update Response message from the serving gateway (S-GW) 380, it informs the target eNode-B (T-eNB) 340 that a user data path of the serving gateway (S-GW) 380 has been switched to another, using the HO Complete ACK message at step S316.

If the target eNode-B (T-eNB) 340 recognizes the switching of the user data path upon receiving the HO Complete ACK message from the MME 360, it transmits a release resource message to the serving eNode-B (S-eNB) 320 at step S317. In this case, the release resource message may command the serving eNode-B (S-eNB) 320 to delete all of its own information needed for implementing data communication between the serving eNode-B (S-eNB) 320 and the UE 300.

If the serving eNode-B (S-eNB) 320 receives the above-mentioned release resource message for requesting the deletion of UE information from the target eNode-B (T-eNB) 340, it deletes (or flushes) the UE information stored in a DL buffer at step S318, and forwards data packets communicating with the UE 300 to the target eNode-B (T-eNB) 340 at step S319. That is, the serving eNode-B (S-eNB) 320 performs the DL data forwarding at step S319.

The serving eNode-B (S-eNB) 320 releases and deletes all information associated with the UE 300 at step S320. Thereafter, the target eNode-B (T-eNB) transmits and receives data packets to/from the serving gateway (S-GW) 380, and the UE can transmit and receive data packets to/from the target eNode-B (T-eNB) 340.

In order to definitely disclose the technical idea of the present invention, the steps S309 to S312 of FIG. 3 will be described with reference to other embodiments of the present invention.

Figure 5:
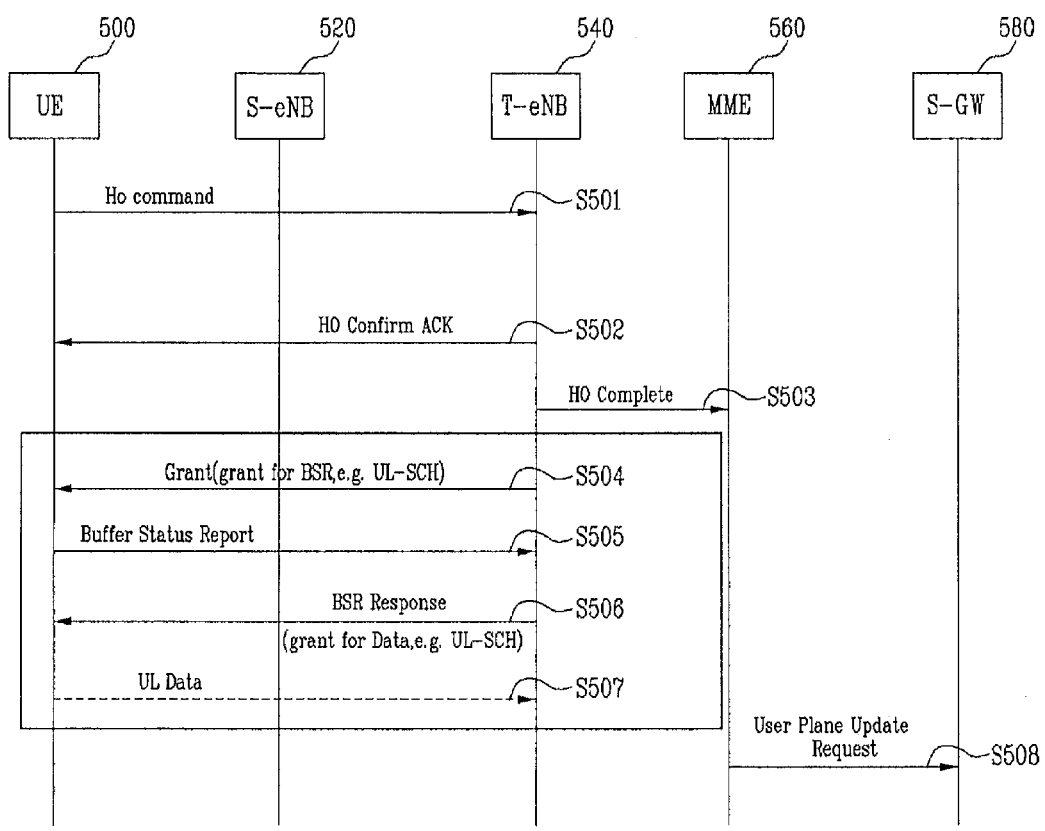
FIG. 5 is a flow chart illustrating a method for allowing the UE to transmit user data to an uplink during the handover according to yet another embodiment of the present invention.

FIG. 5 is a flow chart illustrating a method for allowing the UE to transmit user data to an uplink during the handover according to yet another embodiment of the present invention.

Referring to FIG. 5, a single communication system may include a user equipment (UE) 500, a serving eNode-B (S-eNB) 520, a target eNode-B (T-eNB) 540, a mobility management entity (MME) 560, and a serving gateway (S-GW) 580.

Basically, steps of FIG. 5 are similar to those of FIG. 3. Thus, only descriptions associated with the steps S309 to S312 will hereinafter be described to avoid repeating description of the same steps for the convenience of description.

Referring to FIG. 5, the UE 500 transmits a Confirm message (e.g., an HO Confirm message) to the target eNode-B (T-eNB) 540 at step S501. At step S501, the confirm message of FIG. 5 may use the HO confirm message of FIG. 4. Therefore, the UE 500 indicates the presence of uplink data in the HO confirm message, such that it may transmit the resultant HO confirm message to the target eNode-B (T-eNB) 540.

The target eNode-B (T-eNB) 540 transmits the HO Confirm ACK message to the UE 500 in order to answer the HO Confirm message received from the UE 500 at step S502, and transmits the HO Complete message to the MME 560, such that it may inform the MME 560 that the UE 500 has been shifted to a cell area managed by the target eNode-B (T-eNB) 540 at step S503.

The target eNode-B (T-eNB) 540 checks the HO confirm message received from the UE 500 at step S501. If the UE 500 has user data to be transmitted to the uplink, the target eNode-B (T-eNB) 540 allocates radio resources at step S504, such that the UE can transmit the user data to the target eNode-B (T-eNB) 540.

According to yet another embodiment of the present invention, specific information capable of allocating radio resources transmitting uplink data is contained in the HO confirm response message, such that the resultant HO confirm response message including the specific information can be transmitted to the UE 500. In this case, it should be noted that the above step S504 may be omitted.

Referring to FIG. 5, the UE recognizes the radio resources allocated from the target eNode-B (T-eNB) 540, and may inform the target eNode-B (T-eNB) 540 of the amount of uplink data using the buffer status report (BSR) message at step S505.

The target eNode-B (T-eNB) 540 checks the BSR message received from the UE 500. The target eNode-B (T-eNB) 540 allocates radio resources (e.g., UL-SCH) using the BSR response message in order to allow the UE to transmit uplink user data at step S506.

If the UE 500 receives the radio resources from the target eNode-B (T-eNB) 540, it transmits user data to the target eNode-B (T-eNB) 540 at step S507.

If the MME 560 receives the HO Complete message at step S503, it transmits a User Plane Update Request message to the serving gateway (S-GW) 580 at step S508. So, a downlink transmission path is changed from the serving eNode-B (S-eNB) to the target eNode-B (T-eNB), and then the handover completion process is carried out.

By the above-mentioned embodiments shown in FIGS. 3 to 5, uplink user data is quickly transmitted while the UE performs the handover, such that a handover delay time can be reduced.

The above embodiments are proposed by combining constituent components and characteristics of the present invention according to a predetermined format. If required, individual constituent components or characteristics may be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. It is obvious to those skilled in the art that claims having no explicit citation relationships are combined with each other to implement the embodiments, or new claims obtained by the amendment after the patent application may also be contained in the present invention without departing from the scope and spirit of the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the above-mentioned embodiments of the present invention can be applied to a variety of wireless communication systems. Specifically, the above-mentioned embodiments may also be applied to a variety of mediums performing the handover. Also, the above-mentioned embodiments may also be applied to a variety of methods for transmitting uplink data during the I-RAT handover.

The invention claimed is:

1. A method of transmitting uplink data during a handover in a wireless access system, the method comprising:
    transmitting, to a serving base station, quality of signal information periodically;
    receiving, from the serving base station, a handover command (HO command) message including a dedicated preamble and an identifier of a mobile station, wherein the identifier is for use at a target base station;
    synchronizing with the target base station using at least the identifier or the dedicated preamble;
    transmitting, to the target base station, a handover confirm (HO Confirm) message after a completion of the synchronization with the target base station, wherein the HO Confirm message comprises a header, a handover confirm payload and an information bit, wherein the information bit indicates whether the uplink data is present;
    receiving, from the target base station, information regarding a radio resource for transmitting the uplink data after a handover complete (HO Complete) message for indicating a completion of the handover of the mobile station is transmitted by the target base station to a Mobility Management Entity (MME); and
    transmitting, to the target base station, the uplink data via the radio resource.

2. The method of claim 1, wherein if the uplink data is present, the information bit is set to '1', and if the uplink data is not present, the information bit is set to '0'.

3. A method of receiving uplink data during a handover in a wireless access system, the method comprising:
    receiving, from a serving base station, a message requiring a handover of a mobile station; and
    transmitting, to the mobile station, a handover command (HO Command) message including an identifier of the mobile station and a dedicated preamble, wherein the identifier is used at a target base station;

receiving, from the mobile station, a handover confirm (HO Confirm) message after a completion of a synchronization with the mobile station, wherein the HO Confirm message comprises a header, a handover confirm payload and an information bit, wherein the information bit indicates whether the uplink data is present;

transmitting, to a Mobility Management Entity (MME), a handover complete (HO Complete) message for indicating a completion of the handover of the mobile station;

allocating a radio resource for receiving the uplink data to the mobile station after the HO Complete message is transmitted, if the information bit indicates the uplink data is present; and receiving, from the mobile station, the uplink data via the radio resource.

4. The method of claim 3, wherein if the uplink data is present, the information bit is set to '1', and if the uplink data is not present, the information bit is set to '0'.

* * * * *